United States Patent Office 2,958,678
Patented Nov. 1, 1960

2,958,678

FIBER AND FILM-FORMING POLYCONDENSATES AND THEIR PREPARATION

Andre Jan Conix, Hove-Antwerp, Belgium, assignor to Gevaert Photo-Producten N.V., Mortsel, Belgium, a Belgian company No Drawing. Filed Oct. 25, 1956, Ser. No. 618,171

Claims priority, application Great Britain Oct. 28, 1955

11 Claims. (Cl. 260—78.4)

This invention relates to new aromatic high-polymeric anhydrides and to their preparation, said polymers having valuable properties as fiber and film-forming materials.

Synthetic polyanhydrides derived from aliphatic dicarboxylic acids and capable of being formed into fibers have been known and appear described in the scientific and patent literature (J. W. Hill and W. H. Carothers, J. Am. Chem. Soc. 54 (1932) 1569; Patent Nos. 2,071,250 and 2,071,251). However, the polyanhydrides hitherto described suffer from the defect of a low melting point and, especially, have the deficiency of an appreciable sensitivity to hydrolytic degradation. Fibers drawn from the known aliphatic polyanhydrides lose their strength and flexibility on standing for a few hours at room temperature.

Synthetic aromatic polyanhydrides have been synthesized from isophthalic and terephthalic acid (J. Am. Chem. Soc. 31 (1909) 1319). These products have a very low molecular weight and decompose below their melting point and consequently are incapable of yielding shaped articles such as fibers or films.

It is an object of the present invention to provide linear high-polymeric aromatic anhydrides having valuable properties, such as high melting points, a low degree of solubility in organic solvents, and great stability toward hydrolytic degradation.

Another object of my invention is to provide mixed aromatic anhydrides and to prepare high-polymeric anhydrides from such mixed anhydrides.

Further objects of the invention are directed toward new and useful filaments, fibers, films, and other shaped articles, made from polyanhydrides.

Still further objects will appear from the following description.

In accordance with the present invention, the above and other objects are accomplished by providing new and useful linear, high-polymeric aromatic anhydrides having recurring structural units of the general formula:

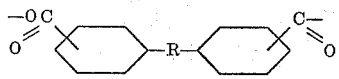

wherein the carbonyl groups are in the para or meta-position, and R is a divalent saturated aliphatic radical in which one or more non-adjacent methylene groups may or may not be replaced by an ether oxygen atom, and whereby the divalent radical unites the two aromatic nuclei directly with 2 to 8 atoms.

The fibers and films according to my invention are formed by extruding the molten polymer, and show molecular orientation by characteristic X-ray patterns.

The polyanhydrides of my invention are derived from dicarboxylic acids of the following general formula:

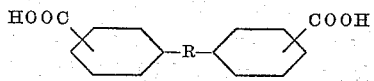

wherein R represents any divalent saturated aliphatic radical containing 2 to 8 atoms as stated hereinbefore, the carboxyl groups being in the para or meta-position.

As specific aromatic dicarboxylic acids, the following may be mentioned:

Diphenoxymethane-p-p'-dicarboxylic acid
Diphenoxymethane-m-m'-dicarboxylic acid
1:3-diphenylpropane-p-p'-dicarboxylic acid
1:3-diphenylpropane-m-m'-dicarboxylic acid
1:4-diphenylbutane-p-p'-dicarboxylic acid
1:4-diphenylbutane-m-m'-dicarboxylic acid
1:5-diphenylpentane-p-p'-dicarboxylic acid
1:5-diphenylpentane-m-m'-dicarboxylic acid
1:6-diphenylhexane-p-p'-dicarboxylic acid
1:6-diphenylhexane-m-m'-dicarboxylic acid
1:2-diphenoxyethane-p-p'-dicarboxylic acid
1:2-diphenoxyethane-m-m'-dicarboxylic acid
1:3-diphenoxypropane-p-p'-dicarboxylic acid
1:3-diphenoxypropane-m-m'-dicarboxylic acid
1:4-diphenoxybutane-p-p'-dicarboxylic acid
1:4-diphenoxybutane-m-m'-dicarboxylic acid
1:5-diphenoxypentane-p-p'-dicarboxylic acid
1:5-diphenoxypentane-m-m'-dicarboxylic acid
1:6-diphenoxyhexane-p-p'-dicarboxylic acid
1:6-diphenoxyhexane-m-m'-dicarboxylic acid
1:5-diphenoxy-3-oxadiethane-p-p'-dicarboxylic acid
1:5-diphenoxy-3-oxadiethane-m-m'-dicarboxylic acid It is to be understood that my invention is not restricted to the production of polyanhydrides derived exclusively from only one kind of the above-mentioned acids. Copolyanhydrides containing units from two or more of these acids fall also within the scope of my invention.

My polyanhydrides may be prepared by heating a mixed anhydride of one of the above-listed dicarboxylic acids and of acetic acid, the mixed anhydride having the following general formula:

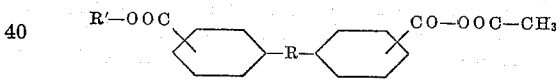

wherein R'=H or CH₃CO, with the functional groups being in meta or para-position, and R having the same significance as above indicated. These mixed anhydrides are new products and are also an object of my invention.

They can conveniently be prepared by heating the dicarboxylic acid in the presence of an excess of acetic anhydride. Heating should be effected at a temperature sufficiently high to cause distillation of acetic acid and acetic anhydride. Particularly good results are obtained if the distillation of the acetic acid occurs through a sufficiently effective fractionation column capable of separating acetic acid from acetic anhydride.

The reaction can be considered terminated when the temperature of the distilling liquid approaches the theoretical boiling point of pure acetic anhydride.

Upon cooling the residue, the mixed anhydrides of the dicarboxylic acid and acetic acid separate out as a crystalline white powder which can be isolated or, if necessary, recrystallized from a suitable solvent, such as benzene or fresh acetic anhydride.

Alternatively, the mixed anhydrides may be kept in acetic anhydride solution and the solution may be used as such for the subsequent polycondensation reaction.

It is also to be noted that my invention is not restricted to the use of mixed anhydrides of an aromatic dicarboxylic acid and acetic acid. Instead of acetic acid, any aliphatic monocarboxylic acid may be used as a component in the mixed anhydride, provided its boiling point is sufficiently low so as to allow distillation at a convenient temperature (140° to 250° C.). Out of such monocarboxylic acids, acetic acid is preferred because of its low boiling point, low cost, and easy availability.

The polycondensation reaction according to my invention is carried out by heating one or more of the above-indicated mixed anhydrides. During the heating, the temperature is advantageously kept near or above the melting point of the resulting polymer, and in any case sufficiently high, so as to cause liberation and distillation of the aliphatic acid anhydride. During this process, the melting point and the viscosity of the reaction mixture gradually increase.

The heating is carried on until a product having cold-drawing properties is obtained. Heating may be effected at atmospheric or subatmospheric pressures. In a preferred method of preparation, heating is at first effected at atmospheric pressure. Once the greater part of acetic anhydrite has distilled, heating is continued under reduced pressure until filaments formed from the melt possess the property of cold-drawing.

In order to obtain polyanhydrides having outstanding fiber-forming and cold-drawing properties, it is important to provide for effective stirring of the reaction mass. This can advantageously be done by bubbling a stream of an inert gas, such as nitrogen, through the molten mass or by agitating the viscous mass by means of a powerful agitator.

Although the polycondensation is advantageously carried out while the reaction mass is maintained in the molten state, this is by no means necessary.

The polycondensation can also be carried out by heating the mixed anhydride of a dibasic acid just below its melting point and gradually raising the temperature as the melting point of the reaction mass increases due to the production of a higher melting polyanhydride, but keeping the temperature always below the melting point. The polycondensation in powder form is best carried out under sub-atmospheric pressure, preferably under high vacuum. Heating is continued until a stage is reached where by melting the reaction product satisfactory fiber-forming and cold-drawing properties are observed.

In another way of practicing my invention, the polycondensation reaction can be carried out in solution. In some cases, it is desired to obtain the final polyanhydride in powder form or in solution. This can be achieved by carrying out the preparation of the polyanhydride in a medium consisting of an inert high boiling solvent for the polyanhydride, such as α-methyl-naphthalene, diphenyl, diphenyloxide or the like. Advantageously, a solvent is chosen with a boiling point well above the boiling point of the aliphatic acid anhydride, thus facilitating the distillation of the latter.

An advantage of this procedure is the fact that the polycondensation can be carried out in a reasonably short time without the use of sub-atmospheric pressure.

According to this particular way of carrying out my invention, the polyanhydride is obtained in powder form upon cooling the polymerized polymer solution if use has been made of a solvent which is only effective at high temperature and is a non-solvent at ordinary temperatures.

If a solvent has been used which is a solvent for the polymer within the whole temperature range from room temperature to the boiling point of the solvent, the polymer is obtained as a viscous solution from which the polymer can be precipitated by adding a sufficient amount of non-solvent.

The products of my invention are linear high-polymeric anhydrides having recurring structural units of the formula:

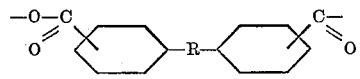

as given and explained above.

My polyanhydrides, when freshly formed and in the undrawn state, are sometimes amorphous in character. If the melts are allowed to cool slowly, crystallization occurs and the glassy transparent solids become opaque.

The polyanhydrides of the invention have melting points up to about 300° C., the exact melting point depending on the particular chemical structure of the repeating unit. Special high melting points are obtained, when the recurring units have a symmetrical structure. The polyanhydrides in which the radicals R are symmetrical and directly united with the aromatic nuclei by means of oxygen atoms are especially valuable polymeric materials. The polyanhydrides are soluble in hot nitrobenzene, hot α-methyl-naphthalene, hot diphenyl, hot diphenyloxide, isophoron, m-cresol, phenol, tetrachlorethane and the like, or in mixtures of same.

It is a particularly unexpected and useful aspect of my invention that the aromatic polyanhydrides show a remarkable resistance to cold and hot acids and alkalis. Even when exposed for longer periods of time to the action of concentrated alkali, the polyanhydrides show only little degradation in molecular weight and they do not lose their ability to be drawn to strong and flexible fibers and films.

When extruded or drawn in the molten state, the polyanhydrides yield filaments or films which can subsequently be cold drawn whereby molecularly oriented structures, i.e. fibers or films of great strength and flexibility are obtained.

Owing to the possibility of carrying out the polycondensation at a very rapid rate without the use of a catalyst, which in other polycondensation reactions such as polyesterifications results in slightly opaque films or filaments, the products and particularly the films made according to my invention are very useful when highly transparent articles are desired such as photographic film base.

The following examples illustrate my invention without limiting, however, the scope thereof.

*Example 1*

Preparation of a mixed anhydride of 1:4-diphenoxy-butane-p-p'-dicarboxylic acid and acetic acid.

34 g. 1:4-diphenoxy-butane-p-p'-dicarboxylic acid and 340 cc. acetic anhydride are heated together in a reaction flask fitted with an efficient fractionation column. Upon reaching the refluxing temperature, a mixture of acetic acid and acetic anhydride gradually distils off. After about 45 minutes reaction time, a homogenous fluid reaction mass is obtained. Heating and distillation of acetic anhydride is continued until the temperature of the distilling liquid reaches the boiling point of acetic anhydride (140° C.). Upon cooling the reaction mixture, a white crystalline precipitate is obtained which is removed by filtration. Yield: 36,5 g. Melting point: 107–111° C. Chemical analysis shows the product to be a mixed anhydride of 1:4-diphenoxy-butane-p-p'-dicarboxylic acid and acetic acid.

*Example 2*

Preparation of a mixed anhydride of 1:2-diphenoxy-ethane-p-p'-dicarboxylic acid and acetic acid.

18 g. 1:2-diphenoxy-ethane-p-p'-dicarboxylic acid and 180 g. acetic anhydride are refluxed together in a reaction flask fitted with an efficient fractionation column. A mixture of acetic acid and acetic anhydride is slowly distilled. After about 15 minutes reaction time, a homogeneous fluid reaction mass is obtained. Heating and distillation of acetic anhydride is continued until the temperature of the distilling liquid reaches the boiling point of acetic anhydride (140° C.). Upon cooling the reaction mixture, a white crystalline precipitate is obtained which can be removed by filtration. Yield: 16,7 g. Melting point: 92–96° C.

Example 3

Preparation of the polyanhydride of 1:4-diphenoxy-butane-p-p'-dicarboxylic acid.

20 g. of a mixed anhydride of 1:4-diphenoxy-butane-p-p'-dicarboxylic acid and acetic acid, as obtained in Example 1, are heated to a temperature of 200° C. Upon heating, the solid gradually melts and a slow stream of nitrogen gas is bubbled through the reaction mass. A very rapid evolution of acetic anhydride takes place, which anhydride is removed from the reaction zone by distillation. After about 5 minutes, the rate of distillation of acetic anhydride slows down. Subsequently, the reaction vessel is evacuated to a vacuum of about 1 mm. Hg and heating is continued. The viscosity of the molten reaction mass gradually increases until, after about 75 minutes reaction time, no apparent change in melt viscosity can be observed. Upon slowly cooling the reaction mass, a hard opaque material is obtained with a melting point of 190–200° C. Upon melting the product, very strong flexible transparent fibers can be drawn continuously from the melt. The fibers possess the characteristic property of cold-drawing. The material can be shown to be polyanhydride of 1:4-diphenoxy-butane-p-p'-dicarboxylic acid and to consist essentially of recurring structural units of the following formula:

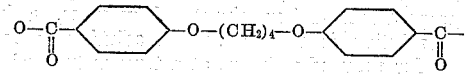

The polyanhydride is soluble in hot α-methyl-naphthalene, hot diphenyl, hot diphenyloxide, hot nitrobenzene, hot dimethylformamide, hot tetraline, nitrobenzene, and tetrachlorethane. Furthermore, the polyanhydride is resistant to concentrated alkalis and acids even over long periods of exposure.

Example 4

Preparation of the polyanhydride of 1:2-diphenoxy-ethane-p-p'-dicarboxylic acid.

7 g. of a mixed anhydride of 1:2-diphenoxy-ethane-p-p'-dicarboxylic acid and acetic acid, as obtained in Example 2, are heated to a temperature of 260° C. Upon heating, the solid gradually melts and a slow stream of nitrogen gas is bubbled through the reaction mass. A very rapid evolution of acetic anhydride takes place, which is removed from the reaction zone by distillation. After about 5 minutes, the rate of distillation of acetic anhydride slows down. Subsequently, the reaction vessel is evacuated to a vacuum of about 1 mm. Hg and heating is continued. The viscosity of the molten mass gradually increases until, after about 75 minutes reaction time, no apparent change in melt viscosity can be observed. From the melt, highly lustrous, strong and flexible fibers can be drawn which show the characteristic property of cold drawing. Upon cooling the melt, a hard transparent solid is obtained which can be crystallized by heating at 120°. The melting point of the crystalline polymer is about 200–220° C. The polymer can be shown to be a polyanhydride of 1:2-diphenoxy-ethane-p-p'-dicarboxylic acid and to consist essentially of recurring structural units of the following formula:

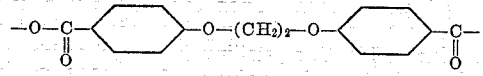

The polyanhydride is resistant to water, alkalis and acids, even when exposed over long periods of time.

Example 5

Preparation of the polyanhydride of the 1:4-diphenyl-butane-p-p'-dicarboxylic acid.

6.5 g. of 1:4-diphenyl-butane-p-p'-dicarboxylic acid and 65 cc. of acetic anhydride are heated together to reflux temperature. A mixture of acetic acid and acetic anhydride is continuously distilled. At the end of the distillation, the residue in the reaction vessel becomes more and more viscous. At this stage, a slow stream of nitrogen is bubbled through the melt and the reaction vessel is evacuated to a vacuum of about 1 mm. Hg. The heating is continued at 285° C. until no apparent change in melt viscosity can be observed. From the melt, transparent strong and flexible fibers can be drawn. They are shown to be resistant to water, alkalis and acids, even on prolonged treatment.

Example 6

Preparation of the polyanhydride of 1:4-diphenoxy-butane-p-p'-dicarboxylic acid.

6.8 g. of a mixed anhydride of 1:4-diphenoxy-butane-p-p'-dicarboxylic acid and acetic acid is heated in a reaction vessel evacuated to a vacuum of about 0.1 mm. Hg. The temperature is kept at 60° C. during 2 hours. Subsequently, the reaction temperature is gradually raised to about 150° C. over a time interval of about 10 hours. Finally, heating is continued for about 2 hours at 150° C. A powdery polymer is obtained, essentially consisting of recurring structural units of the following formula:

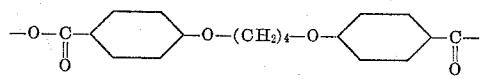

The polyanhydride has a melting point of about 200° C. and is capable of being drawn to continuous strong and flexible fibers, resistant to alkali and acid solutions.

Example 7

Preparation of the polyanhydride of 1:4-diphenoxy-butane-p-p'-dicarboxylic acid.

13 g. of a mixed anhydride of 1:4-diphenoxy-butane-p-p'-dicarboxylic acid and acetic acid and 50 cc. α-methyl-naphthalene are heated together at reflux temperature. A slow stream of nitrogen gas is bubbled through the mixture. After about 15 minutes, a clear solution is obtained. At this stage, slow distillation of the reaction mixture starts. The temperature of the distilling liquid rises gradually to about 235° C. After about 75 minutes, 25 cc. α-methylnaphthalene are added, and distillation is continued for another 75 minutes. The viscosity of the reacting solution rises continually during the whole heating period. The resulting polymer solution is cooled and washed with petroleum ether. A white powdery polymer is obtained, showing a melting point of 190–200° C. From the melt, transparent strong and flexible fibers and films can be extruded which are resistant to alkali and acid solutions.

Example 8

12 g. 1:4-diphenoxy-butane-p-p'-dicarboxylic acid are dissolved in 120 g. acetic anhydride at reflux temperature. The dissolution is complete after about 15 minutes. Upon cooling the reaction mixture, a white precipitate is obtained which can be isolated by filtration.

The precipitate is subsequently heated at a temperature of 225° C. Evolution of acetic acid and acetic anhydride takes place and the melt viscosity of the polymerizing mass gradually increases. After about 10 minutes, heating is continued at reduced pressure for another 45 minutes. At this stage, no apparent change in melt viscosity can be observed and the polycondensation can be considered terminated. From the melt, highly transparent, colorless, flexible and strong fibers can be drawn.

Example 9

Preparation of a mixed anhydride of 1:3-diphenoxy-propane-p-p'-dicarboxylic acid and acetic acid.

600 g. 1:3-diphenoxy-propane-p-p'-dicarboxylic acid and 6½ l. acetic anhydride are refluxed together. After about 1 hour reaction time, all the dicarboxylic acid is dissolved. The solution is filtered to remove any traces of undissolved material, and poured in a vessel fitted with a fractionation column. The solution is concentrated to a volume of about ½ l. by distilling acetic acid and acetic anhydride under vacuum. While concentrating, the temperature of the solution is advantageously held at 60–70° C. Upon cooling the concentrated solution, a white crystalline precipitate is obtained which is removed by filtration. Yield: 700 g. Melting point: 102° C. Chemical analysis shows the product to be a mixed anhydride of 1:3-diphenoxy-propane-p-p'-dicarboxylic acid and acetic acid.

*Example 10*

Preparation of the polyanhydride of 1:3-diphenoxy-propane-p-p'-dicarboxylic acid.

600 g. of a mixed anhydride of 1:3-diphenoxy-propane-p-p'-dicarboxylic acid and acetic acid, as obtained according to example 9, are heated in a stainless steel polycondensation vessel fitted with an effective stirrer and a receiver for collecting condensed vapors. The temperature is raised gradually to 285° over about 45 minutes. A mixture of acetic acid and acetic anhydride is collected in the receiver. After about 15 minutes of heating, the amount of distilling liquid diminishes and a vacuum is applied to the system. Heating is continued under vacuum for about 30 minutes. At this time, stirring is discontinued and the contents of the vessel are extruded through a small orifice at the bottom of the vessel by applying a pressure at the top opening. The molten polymer is pulled out from the vessel and wound on a roller as a continuous ribbon which can afterwards be cut to small chips. The polymer is a hard transparent material which can be crystallized to an opaque mass by heating at about 140° C. The melting point of the crystallized polymer is 265° C. The glass-transition temperature, determined dilatometrically, is about 95° C. By feeding the polymer chips to an extruder, and collecting the extruded molten polymer upon cooled rolls, a self-supporting film is obtained which can be molecularly oriented in two perpendicular directions and heat-set at an elevated temperature. In this way, a very valuable film can be fabricated which is especially useful as a photographic film base owing to a very low water-absorption (less than 0.2% by immersion of the film in water at room temperature for 12 hours) and exceptionally good mechanical properties. Similarly, by feeding the polymer chips to an extruder fitted with a spinning nozzle, very useful filaments can be fabricated. The stability of the thus fabricated films and fibers can be indicated by measuring the weight percent of polymer which is hydrolyzed by immersion of the polymer in a 4% solution of sodium hydroxide in water. Experiments show that over a period of an hour, only 0.1% of the polymer is hydrolyzed at room temperature. Similar experiments carried out on a polysebacic anhydride (prepared according to Patent No. 2,071,250) show that under the same conditions about 56% of the polymer is hydrolyzed. This clearly demonstrates the unexpected stability of the polyanhydrides against hydrolysis.

*Example 11*

Preparation of a mixed anhydride of β,β'-bis(p-carboxyphenoxy)-diethylether and acetic acid.

8.5 g. β,β'-bis(p-carboxyphenoxy)diethylether and 180 g. acetic anhydride are refluxed together. After about 30 minutes of heating, a clear solution is obtained. The solution is concentrated to a volume of about 35 cc. by distilling off a mixture of acetic acid and acetic anhydride under vacuum. Upon cooling the concentrated solution, a white crystalline precipitate is obtained which can be isolated by filtration. Yield: 8 g. Melting point: 125–130° C. Chemical analysis shows the product to be a mixed anhydride of β,β'-bis(p-carboxyphenoxy)-diethylether and acetic acid.

*Example 12*

Preparation of the polyanhydride of β,β'-bis(p-carboxyphenoxy)-diethylether.

8 g. of a mixed anhydride of β,β'-bis(p-carboxyphenoxy)-diethylether and acetic acid, prepared according to Example 11, are heated to a temperature of 225° C. Upon heating, the solid gradually melts and a slow stream of nitrogen gas is bubbled through the reaction mass. A very rapid evolution of acetic anhydride takes place, which is removed from the reaction mass by distillation. Subsequently, the reaction vessel is evacuated to a vacuum of about 0.5 mm. Hg and heating is continued. The viscosity of the molten mass gradually increases until, after about 30 minutes reaction time, no apparent change in melt viscosity can be observed. From the melt, transparent, strong and flexible fibers can be drawn which possess the property of cold drawing. Upon cooling the melt, a hard transparent solid is obtained which can be crystallized by heating. The melting point of the crystalline material is 185–190° C.

*Example 13*

Preparation of the polyanhydride of 1:3-diphenoxy-propane-m-m'-dicarboxylic acid.

14 g. of the dibasic acid of the formula

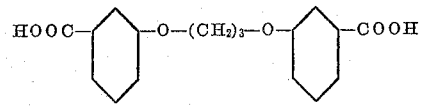

and 150 cc. acetic anhydride are heated together at reflux temperature. After about 15 minutes, a homogeneous solution is obtained. The solution is concentrated under reduced pressure at a temperature of about 50° C. The remaining amber-colored viscous solution is heated at 190° C. under atmospheric pressure until most of the excess of acetic anhydride and acetic acid is distilled off. Subsequently, the reaction mass is heated under reduced pressure (0.5–1 mm. Hg). The viscosity of the molten reaction mass gradually increases until, after about 3½ hours reaction time, no apparent change in melt viscosity can be observed. Upon cooling the mass, a hard transparent polymer is obtained which by keeping at a temperature of 120°–130° C. crystallizes into a yellow-colored opaque material with a melting point of 200° C. Upon melting the product, strong flexible and transparent fibers can be drawn continuously from the melt. The fibers possess the characteristic property of cold-drawing and show great resistance to degradation by hydrolysis.

*Example 14*

Preparation of the polyanhydride of 1:5-diphenoxy-pentane-m-m'-dicarboxylic acid.

11 g. of the dibasic acid of the formula

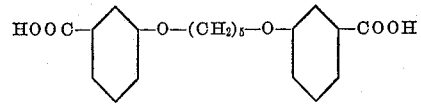

are dissolved in 110 cc. acetic anhydride at reflux temperature. The solution is concentrated under reduced pressure until a viscous solution is obtained which by further heating at 190° under a reduced pressure of about 0.1–0.5 mm. Hg over 2½ hours and distillation of acetic anhydride can be transformed into a fiber-forming high polymer. Upon cooling the viscous reaction mass, a transparent horny polymer is obtained which by heating at 70° C. crystallizes into a yellowish opaque material with a melting point at about 179° C. Upon melting the product, strong flexible and transparent fibers can be drawn continuously from the melt. The fibres possess the characteristic property of cold-drawing.

*Example 15*

Preparation of the polyanhydride of p-carboxy-phenoxy-p'-carboxyphenyl-methane-dicarboxylic acid.

4 g. of a dicarboxylic acid of the following formula

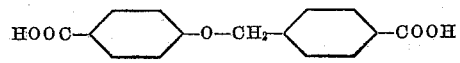

and 50 cc. acetic anhydride are refluxed together during 10 minutes. The solution is concentrated under vacuum until a volume of about 10 cc. is obtained. On cooling the concentrated solution, a white precipitate is obtained, showing a melting point of 50–60° C. Chemical analysis shows the product to be a mixed anhydride of the dicarboxylic acid and acetic acid.

The mixed anhydride is subsequently heated at 280° C. under sub-atmospheric pressure (0.5 mm.) during 30 minutes. After this time, a viscous melt is obtained from which fibers can be drawn, showing cold-drawing properties. On cooling, a brownish glass-like solid is obtained which can be crystallized by heating. The melting point of the crystallized polymer is about 260° C.

*Example 16*

Preparation of the polyanhydride of 1:3-diphenoxy-propane-p-p'-dicarboxylic acid.

30 g. of 1:3-diphenoxy-propane-p-p'-dicarboxylic acid is dissolved in 200 cc. butyric anhydride at reflux temperature. The solution is concentrated by distilling off butyric anhydride. By cooling the concentrated solution, a precipitate is obtained showing a melting point of 160–170° C. Chemical analysis shows the product to be a mixed anhydride of 1:3-diphenoxy-propane-p-p'-dicarboxylic acid. The mixed anhydride is further condensed by heating at 280°, first by atmospheric pressure and in the final stage of the reaction by a sub-atmospheric pressure of about 1 mm. Hg. During the polycondensation a mixture of butyric acid and butyric anhydride is distilled from the reaction mixture. After about 50 minutes condensation time a viscous melt is obtained from which fibers can be drawn, showing cold-drawing properties.

I claim:

1. High-polymeric linear aromatic anhydrides composed of recurring structural units of the formula:

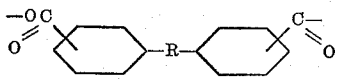

said units being derived from an aromatic dicarboxylic acid selected from the group consisting of p,p'-dicarboxylic acid and m,m'-dicarboxylic acid, and R being a member selected from the group consisting of divalent saturated aliphatic hydrocarbon radicals and divalent saturated aliphatic oxahydrocarbon radicals wherein at least one oxygen atom forms an ether linkage with one of the aromatic nuclei, both kinds of said divalent radical directly uniting the two aromatic nuclei with 2 to 8 atoms.

2. High-polymeric linear aromatic anhydrides composed of recurring structural units of the formula:

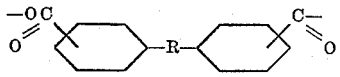

said units being derived from an aromatic dicarboxylic acid selected from the group consisting of p,p'-dicarboxylic acid and m,m'-dicarboxylic acid and R being —O—(CH$_2$)$_n$—O— wherein $n$ is a whole member from 1 to 6.

3. High-polymeric linear aromatic anhydrides composed of recurring structural units of the formula:

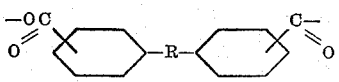

said units being derived from an aromatic dicarboxylic acid selected from the group consisting of p,p'-dicarboxylic acid and m,m'-dicarboxylic acid, and R being —(CH$_2$)$_n$— wherein $n$ is a whole number from 2 to 8.

4. Process for the preparation of linear high-polymeric anhydrides, in which mixed anhydrides of monovalent lower fatty acids and aromatic dicarboxylic acids of the general formula:

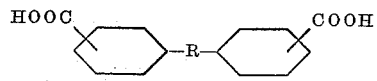

are heated, the aromatic dicarboxylic acid used being selected from the group consisting of p,p'-dicarboxylic acid and m,m'-dicarboxylic acid, and R being a member selected from the group consisting of divalent saturated aliphatic hydrocarbon oxahydrocarbon radicals wherein at least one oxygen atom forms an ether linkage with one of the aromatic nuclei, both kinds of said divalent radical directly uniting the two aromatic nuclei with 2 to 8 atoms, said heating being done between 160° and 300° C. under distillation of the fatty acid anhydride until a polymer showing fiber and film-forming properties is obtained.

5. Process for the preparation of linear high-polymeric anhydrides, in which mixed anhydrides of monovalent lower fatty acids and aromatic dicarboxylic acids of the general formula:

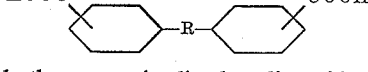

are heated, the aromatic dicarboxylic acid used being selected from the group consisting of p,p'-dicarboxylic acid and m,m'-dicarboxylic acid, and R being —O—(CH$_2$)$_n$—O— wherein $n$ is a whole number from 1 to 6, said heating being done between 160° and 300° C. under distillation of the fatty acid anhydride until a polymer showing fibers and film-forming properties is obtained.

6. Process for the preparation of linear high-polymeric anhydrides, in which mixed anhydrides of monovalent lower fatty acids and aromatic dicarboxylic acids of the general formula:

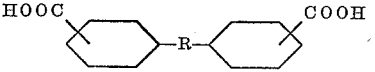

are heated, the aromatic dicarboxylic acid used being selected from the group consisting of p,p'-dicarboxylic acid and m,m'-dicarboxylic acid, and R being —(CH$_2$)$_n$— wherein $n$ is a whole number from 2 to 8, said heating being done between 160° and 300° C. under distillation of the fatty acid anhydride until a polymer showing fiber and film-forming properties is obtained.

7. Process for the preparation of linear high-polymeric anhydrides, in which mixed anhydrides of monovalent lower fatty acids and aromatic dicarboxylic acids of the general formula:

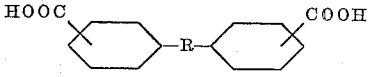

are heated, the aromatic dicarboxylic acid used being selected from the group consisting of p,p'-dicarboxylic acid and m,m'-dicarboxylic acid, and R being a member selected from the group consisting of divalent saturated aliphatic hydrocarbon oxahydrocarbon radicals wherein at least one oxygen atom forms an ether linkage with one of the aromatic nuclei, both kinds of said divalent radical directly uniting the two aromatic nuclei with 2 to 8 atoms, the mixed anhydrides being heated first at atmospheric pressure and then under reduced pressure under distillation of the fatty acid anhydride until a polymer showing fiber and film-forming properties is obtained.

8. Process for the preparation of linear high-polymeric anhydrides, in which mixed anhydrides of monovalent lower fatty acids and aromatic dicarboxylic acids of the general formula:

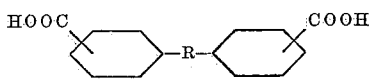

are heated, the aromatic dicarboxylic acid used being selected from the group consisting of p,p'-dicarboxylic acid and m,m'-dicarboxylic acid, and R being a member selected from the group consisting of divalent saturated aliphatic hydrocarbon oxahydrocarbon radicals wherein at least one oxygen atom forms an ether linkage with one of the aromatic nuclei, both kinds of said divalent radical directly uniting the two aromatic nuclei with 2 to 8 atoms, said heating being done in order to maintain the reaction mass in the molten state, and said mass is mixed by bubbling a stream of nitrogen through same until a polymer showing fiber and film-forming properties is obtained.

9. The anhydrides according to claim 1, wherein said units are derived from an aromatic dicarboxylic acid selected from the group consisting of p,p'-dicarboxylic acid and m,m'-dicarboxylic acid, and R is a symmetrical divalent saturated aliphatic oxahydrocarbon radical wherein at least one oxygen atom forms an ether linkage with one of the aromatic nuclei.

10. A film of the high-polymeric linear anhydrides of claim 1.

11. A filament of the high-polymeric linear anhydrides of claim 1.

References Cited in the file of this patent

UNITED STATES PATENTS

| | | |
|---|---|---|
| 2,071,250 | Carothers | Feb. 16, 1937 |
| 2,071,251 | Carothers | Feb. 16, 1937 |
| 2,456,150 | Dickson | Mar. 22, 1949 |

FOREIGN PATENTS

| | | |
|---|---|---|
| 634,609 | Great Britain | Mar. 22, 1950 |
| 707,913 | Great Britain | Apr. 28, 1954 |

OTHER REFERENCES

Carothers: Collected Papers, Interscience (1940), pages 96–97, 168–178, 186, 202–211 and 241.